United States Patent
Brannon et al.

(10) Patent No.: US 6,364,018 B1
(45) Date of Patent: Apr. 2, 2002

(54) LIGHTWEIGHT METHODS AND COMPOSITIONS FOR WELL TREATING

(75) Inventors: Harold D. Brannon, Spring; Allan R. Rickards, Pinehurst; Christopher J. Stephenson, Houston, all of TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 09/579,147

(22) Filed: May 25, 2000

Related U.S. Application Data

(63) Continuation-in-part of application No. 09/519,238, filed on Mar. 6, 2000, which is a continuation-in-part of application No. 09/085,416, filed on May 27, 1998, now Pat. No. 6,059,034, which is a continuation-in-part of application No. 08/756,414, filed on Nov. 27, 1996, now abandoned.

(30) Foreign Application Priority Data

Nov. 21, 1997 (DK) .............................................. 1333/97

(51) Int. Cl.[7] .............................................. E21B 43/26
(52) U.S. Cl. ........................ 166/280; 166/308; 507/924
(58) Field of Search ................................ 166/278, 280, 166/308, 310, 276, 281; 501/128; 507/903, 269

(56) References Cited

U.S. PATENT DOCUMENTS

| | | | |
|---|---|---|---|
| 3,089,542 A | 5/1963 | Kolodny | 166/42 |
| 3,155,159 A | 11/1964 | McGuire et al. | 166/29 |
| 3,254,064 A | 5/1966 | Nevins | 260/87.7 |
| 3,363,690 A | 1/1968 | Fischer | 166/33 |
| 3,387,888 A | 6/1968 | Shock et al. | 299/4 |
| 3,481,401 A | 12/1969 | Graham | 166/280 |
| 3,659,651 A | 5/1972 | Graham | 166/280 |
| 3,677,941 A | 7/1972 | Mazzara et al. | 252/8.55 R |
| 3,888,311 A | 6/1975 | Cooke, Jr. | 166/280 |
| 3,917,345 A | 11/1975 | Davidson et al. | 299/5 |

(List continued on next page.)

FOREIGN PATENT DOCUMENTS

| | | |
|---|---|---|
| EP | 0 771 935 A1 | 7/1997 |
| EP | 0 853 186 A2 | 7/1998 |
| EP | 0 859 125 A1 | 8/1998 |
| EP | 0 879 935 A2 | 11/1998 |
| EP | 0 933 498 A1 | 8/1999 |
| GB | 994377 | 6/1965 |
| GB | 2319 796 A | 6/1998 |
| WO | WO 96/04464 | 2/1996 |
| WO | WO 99/27229 | 6/1999 |

OTHER PUBLICATIONS

Foreign Search Report dated Mar. 3, 1998 for GB Application No. 9725153.2 (reference B8), a counterpart to Danish Application No. 1333/97 from which references A42 and B7 claim priority.
International Search Report dated Oct. 13, 1998 for PCT/US98/10735 (reference B7).
Ward, "Industrial Utilization of $C_{21}$ Dicarboxylic Acid," *Journal of the American Oil Chemists' Society*, vol. 52, pp. 219–224 (Sep. 1974).
Harold A. Wittcoff and Bryan G. Rueben, "Industrial Organic Chemicals," John Wiley & Sons, Inc., Chapter 13.3, pp. 368–369, (1996).

(List continued on next page.)

*Primary Examiner*—Frank Tsay
(74) *Attorney, Agent, or Firm*—O'Keefe, Egan & Peterman, LLP

(57) ABSTRACT

Methods and compositions useful for hydraulic fracturing of subterranean formations that utilize relatively lightweight and/or substantially neutrally buoyant particles as particulate proppant material.

24 Claims, 3 Drawing Sheets

U.S. PATENT DOCUMENTS

| | | | |
|---|---|---|---|
| 3,929,191 A | 12/1975 | Graham et al. | 166/276 |
| 3,998,744 A | 12/1976 | Arnold et al. | 252/8.55 R |
| 4,049,866 A | 9/1977 | Lane et al. | 428/402 |
| 4,137,182 A | 1/1979 | Golinkin | 252/8.55 |
| 4,193,453 A | 3/1980 | Golinkin | 166/295 |
| 4,518,039 A | 5/1985 | Graham et al. | 166/276 |
| 4,527,627 A | 7/1985 | Graham et al. | 166/280 |
| 4,531,594 A * | 7/1985 | Cowan | 175/72 |
| 4,664,619 A | 5/1987 | Johnson et al. | 431/154 |
| 4,664,819 A | 5/1987 | Glaze et al. | 252/8.551 |
| 4,779,680 A | 10/1988 | Sydansk | 166/300 |
| 4,869,960 A | 9/1989 | Gibb et al. | 428/405 |
| 4,969,523 A | 11/1990 | Martin et al. | 166/278 |
| 5,180,020 A * | 1/1993 | Fuh et al. | 175/72 |
| 5,207,282 A * | 5/1993 | Fuh et al. | 175/72 |
| 5,251,697 A | 10/1993 | Shuler | 166/268 |
| 5,330,005 A | 7/1994 | Card et al. | 166/280 |
| 5,381,864 A | 1/1995 | Nguyen et al. | 166/280 |
| 5,422,183 A | 6/1995 | Sinclair et al. | 428/403 |
| 5,439,055 A | 8/1995 | Card et al. | 166/280 |
| 5,439,059 A | 8/1995 | Harris et al. | 166/300 |
| 5,492,178 A | 2/1996 | Nguyen et al. | 166/276 |
| 5,501,274 A | 3/1996 | Nguyen et al. | 166/276 |
| 5,501,275 A | 3/1996 | Card et al. | 166/280 |
| 5,531,274 A | 7/1996 | Bienvenu, Jr. | 166/280 |
| 5,582,249 A | 12/1996 | Caveny et al. | 166/276 |
| 5,604,186 A | 2/1997 | Hunt et al. | 507/204 |
| 5,697,440 A | 12/1997 | Weaver et al. | 166/281 |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,839,510 A | 11/1998 | Weaver et al. | 166/276 |
| 5,964,295 A | 10/1999 | Brown et al. | 166/308 |
| 6,016,869 A * | 1/2000 | Burts, Jr. | 166/295 |
| 6,016,870 A | 1/2000 | Dewprshad et al. | 166/295 |
| 6,059,034 A | 5/2000 | Rickards et al. | 166/280 |

OTHER PUBLICATIONS

Brochure, "Functional Products Group Coatings & Ink Division," Henkel.

U.S. application Ser. No. 09/519,238, filed Mar. 6, 2000 (BJSC:288), co–pending.

U.S. application Ser. No. 09/579,146, filed May 25, 2000, (BJSC:294), co–pending.

Search report dated Aug. 11, 1999 for Dutch Patent Application No. 1007616 (counterpart to Reference B8, and to Danish Application No. 1333/97 from which references A42 and B7 claim priority).

Martin, "Fracturing Recommendation" for Conoco State A 29#8, BJ Services, Feb. 4, 1999.

Martin, "Fracturing Recommendation" for Conoco State A 29#8, BJ Services, Feb. 5, 1999.

Treatment Report for Conoco State A 29#8, Feb. 11, 1999.

Invoice for treatment of Conoco State A 29#8, Feb. 11, 1999.

BJ Services, "FlexSand™ Proppant Pack Enhancement Additive" Ad, Mar. 2000 issue of Journal of Petroleum Technology.

* cited by examiner

LIGHTWEIGHT METHODS AND COMPOSITIONS FOR WELL TREATING

The present application is a continuation-in-part of U.S. patent application Ser. No. 09/519,238, filed Mar. 6, 2000; which is a continuation-in-part of U.S. patent application Ser. No. 09/085,416, filed May 27, 1998, which issued as U.S. Pat. No. 6,059,034; which is a continuation-in-part of U.S. patent application Ser. No. 08/756,414, filed Nov. 27, 1996, now abandoned, and which also claims priority to Danish patent application S/N 1333/97 filed Nov. 21, 1997.

BACKGROUND OF THE INVENTION

1. Field of the Invention

This invention relates generally to subterranean formation treatments and, more specifically, to hydraulic fracturing treatments for subterranean formations. In particular, this invention relates to use of relatively lightweight and/or substantially neutrally buoyant particles as proppant material in hydraulic fracturing treatments.

2. Description of the Related Art

Hydraulic fracturing is a common stimulation technique used to enhance production of fluids from subterranean formations. In a typical hydraulic fracturing treatment, fracturing treatment fluid containing a solid proppant material is injected into the formation at a pressure sufficiently high enough to cause the formation or enlargement of fractures in the reservoir. During a typical fracturing treatment, proppant material is deposited in a fracture, where it remains after the treatment is completed. After deposition, the proppant material serves to hold the fracture open, thereby enhancing the ability of fluids to migrate from the formation to the well bore through the fracture. Because fractured well productivity depends on the ability of a fracture to conduct fluids from a formation to a wellbore, fracture conductivity is an important parameter in determining the degree of success of a hydraulic fracturing treatment.

Hydraulic fracturing treatments commonly employ proppant materials that are placed downhole with a gelled carrier fluid (e.g., aqueous-based fluid such as gelled brine). Gelling agents for proppant carrier fluids may provide a source of proppant pack and/or formation damage, and settling of proppant may interfere with proper placement downhole. Formulation of gelled carrier fluids usually requires equipment and mixing steps designed for this purpose.

SUMMARY OF THE INVENTION

In the disclosed method, the application of relatively lightweight and/or substantially neutrally buoyant particulate material as a fracture proppant particulate advantageously may provide for substantially improved overall system performance in hydraulic fracturing applications. By "relatively lightweight" it is meant that a particulate has a density that is substantially less than a conventional proppant particulate material employed in hydraulic fracturing operations, e.g., sand or having a density similar to these materials. By "substantially neutrally buoyant", it is meant that a particulate has a density sufficiently close to the density of a selected ungelled or weakly gelled carrier fluid (e.g., ungelled or weakly gelled completion brine, other aqueous-based fluid, or other suitable fluid) to allow pumping and satisfactory placement of the proppant particulate using the selected ungelled or weakly gelled carrier fluid. For example, urethane resin-coated ground walnut hulls having a specific gravity of from about 1.25 to about 1.35 grams/cubic centimeter may be employed as a substantially neutrally buoyant proppant particulate in completion brine having a density of about 1.2. It will be understood that these values are exemplary only. As used herein, a "weakly gelled" carrier fluid is a carrier fluid having minimum sufficient polymer, viscosifier or friction reducer to achieve friction reduction when pumped down hole (e.g., when pumped down tubing, work string, casing, coiled tubing, drill pipe, etc.), and/or may be characterized as having a polymer or viscosifier concentration of from greater than about 0 pounds of polymer per thousand gallons of base fluid to about 10 pounds of polymer per thousand gallons of base fluid, and/or as having a viscosity of from about 1 to about 10 centipoises. An ungelled carrier fluid may be characterized as containing about 0 pounds per thousand gallons of polymer per thousand gallons of base fluid.

Advantageously, in one embodiment use of substantially neutral buoyant particulate material may eliminate the need for gellation of carrier fluid, thus eliminating a source of potential proppant pack and/or formation damage. Furthermore, a relatively lightweight particulate material may be easier to place within a targeted zone due to lessened settling constraints. Elimination of the need to formulate a complex suspension gel may mean a reduction in tubing friction pressures, particularly in coiled tubing and in the amount of onlocation mixing equipment and/or mixing time requirements, as well as reduced costs. Furthermore, when treated to have sufficient strength (e.g., by substantially filling the permeable porosity of a porous particle with resin or hardener), the disclosed relatively lightweight proppant particles may be employed to simplify hydraulic fracturing treatments performed through coil tubing, by greatly reducing fluid suspension property requirements. Downhole, a much reduced propensity to settle (as compared to proppant particulates) may be achieved. In this regard, the disclosed substantially neutral buoyancy proppant material may be advantageously employed in any deviated well having an angle of deviation of between about 0 degree and about 90 degrees with respect to the vertical. However, in one embodiment, the disclosed particulate material may be advantageously employed in horizontal wells, or in deviated wells having an angle with respect to the vertical of between about 30 degrees and about 90 degrees, alternatively between about 75 degrees and about 90 degrees. Thus, use of the disclosed relatively lightweight and/or substantially neutrally buoyant particulate materials disclosed herein may be employed to achieve surprising and unexpected improvements in fracturing methodology, including reduction in proppant pack and/or formation damage, and enhancement of well productivity.

In another embodiment, protective and/or hardening coatings, such as resins described elsewhere herein may be selected to modify or customize the specific gravity of a selected base particulate proppant material, e.g., ground walnut hulls, etc. Modification of particulate specific gravity (i.e., to have a greater or lesser specific gravity) may be advantageously employed, for example, to provide proppant particulates of customized specific gravity for use as a substantially neutrally buoyant particulate with a variety of different weight or specific gravity carrier fluids. In yet another embodiment, protective and/or hardening-type coatings may be optionally curable to facilitate proppant pack consolidation after placement. In this regard, curable resins are know to those of skill in the art, and with benefit of this disclosure may be selected to fit particular applications accordingly.

The disclosed relatively lightweight and/or substantially neutrally buoyant particulate proppant materials may be employed with carrier fluids that are gelled, non-gelled, or that have a reduced or lighter gelling requirement as compared to carrier fluids employed with conventional fracture treatment methods. In one embodiment employing one or more of the disclosed substantially neutrally buoyant particulate materials and a brine carrier fluid, mixing equipment need only include such equipment that is capable of (a) mixing the brine (dissolving soluble salts), and (b) homogeneously dispersing in the substantially neutrally buoyant particulate material.

In one embodiment, a substantially neutrally buoyant particulate proppant material may be advantageously pre-suspended and stored in a storage fluid (e.g. brine of near or substantially equal density), and then pumped or placed downhole as is, or diluted on the fly.

In one respect, disclosed is a hydraulic fracturing method for a well penetrating a subterranean formation, including introducing a relatively lightweight and/or substantially neutral density particulate proppant material into the well. Individual particles of the particulate material optionally may have a shape with a maximum length-based aspect ratio of equal to or less than about 5. Individual particles may also be optionally coated with protective materials such as resins and/or hardeners, for example, "2AC" phenol formaldehyde hardener from BORDEN CHEMICAL. Examples of suitable relatively lightweight and/or substantially neutrally buoyant materials for use in aqueous based carrier fluids include, but are not limited to, ground or crushed nut shells, ground or crushed seed shells, ground or crushed fruit pits, processed wood, or a mixture thereof. Optional protective coatings for coating at least a portion of individual particles of such relatively lightweight and/or substantially neutrally buoyant materials include, but are not limited to at least one of phenol formaldehyde resin, melamine formaldehyde resin, urethane resin, or a mixture thereof. Other optional coating compositions known in the art to be useful as hardeners for such materials (e.g., coating materials that function or serve to increase the elastic modulus of the material) may be also employed in conjunction or as an alternative to protective coatings, and may be placed underneath or on top of one or more protective coatings. It will be understood by those of skill in the art that such protective and/or hardening coatings may be used in any combination suitable for imparting desired characteristics to a relatively lightweight and/or substantially neutrally buoyant particulate proppant material, including in two or more multiple layers. In this regard successive layers of protective coatings, successive layers of hardening coatings, alternating layers of hardening and protective coatings, etc. are possible. Mixtures of protective and hardening coating materials may also be possible.

In another respect, disclosed is a relatively lightweight and/or substantially neutrally buoyant fracture proppant material for use in a hydraulic fracturing treatment that is a ground or crushed walnut shell material that is coated with a resin to substantially protect and water proof the shell. Such a material may have a specific gravity of from about 1.25 to about 1.35, and a bulk density of about 0.67. In one exemplary case, size of such a material may be about 12/20 US mesh size. In another exemplary case, sizes may range from about 4 mesh to about 100 mesh. Advantageously, in some embodiments, such ground walnut shells may serve to attract fines and formation particles by their resinous nature. In one embodiment for the manufacture of such particles for proppant applications, an optional hardener may be applied to a ground walnut shell material first followed by a urethane coating as described elsewhere herein that may vary in amount as desired. For example, such a coating material may be present in an amount of from about 1% to about 20%, alternatively from about 10% to about 20% by weight of total weight of individual particles. Alternatively, such a coating material may be present in an amount of from about 2% to about 12% by weight of total weight of individual particles. Amount of resin may depend, for example, on price and application. In this regard, particulates may be first sprayed or otherwise coated with a hardener, and a coating may be applied to be about 12% by weight of total weight of the particle.

In one embodiment, the disclosed relatively lightweight particulate proppant material may be introduced or pumped into a well as neutrally buoyant particles in, for example, a saturated sodium chloride solution carrier fluid or a carrier fluid that is any other completion or workover brine known in the art, for example, having a specific gravity of from about 1 to about 1.5, alternatively from about 1.2 to about 1.5, further alternatively about 1.2, thus eliminating the need for damaging polymer or fluid loss material. In one embodiment, such a material may be employed as proppant material at temperatures up to about 150° F., and pressures up to about 1500 psi. However, these ranges of temperature and closure stress are exemplary only, it being understood that the disclosed materials may be employed as proppant materials at temperatures greater than about 150° F. and/or at closure stresses greater than about 1500 psi, it also being understood with benefit of this disclosure that core and/or layer material/s may be selected by those of skill in the art to meet and withstand anticipated downhole conditions of a given application.

Advantageously, in one embodiment the low specific gravity of the relatively lightweight proppant material may be taken advantage of to result in a larger width for the same loading (i.e., pound per square foot of proppant) to give much larger total volume and increased width for the same mass. Alternatively, this characteristic allows for smaller volumes of proppant material to be pumped while still achieving an equivalent width.

In yet another respect, disclosed is a method of fracturing a subterranean formation, including: injecting a particulate material into the subterranean formation at a pressure above the fracturing pressure of the formation; wherein at least a portion of the individual particles of the particulate material each include a first material selected from at least one of ground or crushed nut shells, ground or crushed seed shells, ground or crushed fruit pits, processed wood, or a mixture thereof; and wherein at least a portion of the individual particles of the particulate material each includes a core component of the first material at least partially surrounded by at least one layer component of second material, the second material including a protective or hardening coating.

In yet another respect, disclosed is a method of fracturing a subterranean formation, including: introducing a particulate material suspended in a carrier fluid into the subterranean formation at a pressure above a fracturing pressure of the subterranean formation. In this method, at least a portion of the individual particles of the particulate material may be substantially neutrally buoyant in the carrier fluid and may include: a core component of a first material selected from at least one of ground or crushed nut shells, ground or crushed seed shells, ground or crushed fruit pits, processed wood, or a mixture thereof; and at least one layer component of second material surrounding the core component, the second material including a protective or hardening coating.

DETAILED DESCRIPTION OF SPECIFIC EMBODIMENTS

Figure 1:
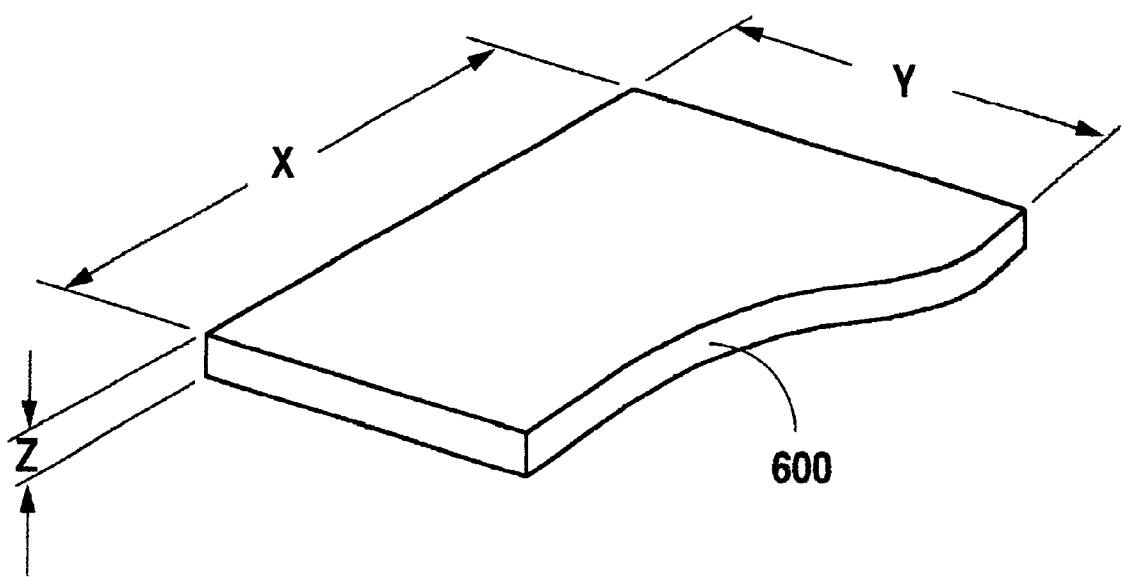
FIG. 1 is a representation of a particle of ground walnut hull material according to one embodiment of the disclosed method.

As used herein, the indefinite articles "a" and "an" connote "one or more."

Examples of types of materials suitable for use as relatively lightweight and/or substantially neutrally buoyant proppant particulates include, but are not limited to, ground or crushed shells of nuts such as walnut, pecan, almond, ivory nut, brazil nut, etc.; ground or crushed seed shells (including fruit pits) of seeds of fruits such as plum, peach, cherry, apricot, etc.; ground or crushed seed shells of other plants such as maize (e.g. corn cobs or corn kernels), etc. processed wood materials such as those derived from woods such as oak, hickory, walnut, poplar, mahogany, etc. including such woods that have been processed by grinding, chipping, or other form of particalization. Additional information on such materials and methods for use thereof may be found in U.S. patent application Ser. No. 09/519,238 filed Mar. 6, 2000 and entitled "Formation Treatment Method Using Deformable Particles," which is incorporated herein by reference. Further information on materials and methods may also be found in the United States Patent Application entitled "Lightweight Methods and Compositions for Sand Control" by Harold D. Brannon, Allan R. Rickards, and Christopher J. Stephenson, filed on the same day as the present application, and which is incorporated herein by reference. Further information on hydraulic fracturing methods and materials for use therein may be found in U.S. Pat. No. 6,059,034, which is also incorporated herein by reference.

In one embodiment, specific gravity of such materials may range from about 0.4 to about 4, alternatively from about 0.8 to about 4. In another embodiment, specific gravity of such materials may range from about 0.4 to about 1.5, alternatively from about 0.5 to about 1.5. In another embodiment, specific gravity of such materials may range from about 0.5 to about 2, alternatively from about 0.5 to about 1.5, alternatively from about 1 to about 1.5, alternatively about 1.2. It will be understood that the foregoing embodiments are exemplary only and greater or lesser values are also possible. With benefit of this disclosure, those of skill in the art will understand that selection of suitable specific gravity of such a proppant particulate will depend, in part, on the specific gravity of the carrier fluid and on whether it is desired that the selected proppant particle be relatively lightweight or substantially neutrally buoyant in the selected carrier fluid, and/or whether or not it is desired that the carrier fluid be non-gelled or non-viscosified.

It will be understood with benefit of this disclosure that suitable relatively lightweight and/or substantially non-buoyant materials may be chipped, ground, crushed, or otherwise processed to produce particulate material having any particle size or particle shape suitable for use in the methods disclosed herein. In one exemplary embodiment, particle sizes include, but are not limited to, sizes ranging from about 4 mesh to about 100 mesh, alternatively from about 12 mesh to about 50 mesh. In another exemplary embodiment, particle sizes include, but are not limited to, sizes ranging from about 8 mesh to about 40 mesh, alternatively from about 14 mesh to about 40 mesh. Shapes of such particles may vary, but in one embodiment may be utilized in shapes having maximum length-based aspect ratio values as described elsewhere herein for particles, and in one embodiment may have a maximum length-based aspect ratio of less than or equal to about 5. Once again, the preceding ranges of values are exemplary only, and values outside these ranges are also possible.

Specific examples of suitable materials suitable for the relatively low closure stress embodiments described above include, but are not limited to ground or crushed nut shells available from suppliers such as "COMPOSITION MATERIALS, INC." of Milford, Conn.; "AGRASHELL, INC." of Bath, Pa.; "BAROID", and/or "CALIFORNIA NUT ASSOCIATION". These products include "walnut shell grit" available from "COMPOSITION MATERIALS, INC.", "AD-3" ground walnut hulls from "AGRASHELL" (having a particle size of about 12/20 mesh, a specific gravity of about 1.2, and a maximum length-based aspect ratio of about 5), as well as "AD-6B" ground walnut shells (having a particle size of about 20/40 mesh, a specific gravity of about 1.2, and a maximum length-based aspect ratio of about 5). Such ground walnut hull material is available, for example, for use as a blasting media. FIG. 1 shows a simplified representation of a particle 600 of ground walnut hull material having relative dimension ratio of X:Y:Z. In one exemplary embodiment employing ground walnut hull material, values of X, Y and Z may be expressed as a relative ratio (e.g., independent of any particular units of measurement employed) as follows: X may be from about 1 to about 5; Y may be from about 1 to about 5, and Z may be about 1. Alternatively, X may be from about 2 to about 5; Y may be from about 2 to about 5, and Z may be about 1. These given ranges are exemplary only, and relative dimensional values of any one or more of X, Y, and Z may fall outside these value ranges. In alternate embodiments, ground nuts such as ground walnut hulls may be processed to have a substantially spherical or beaded shape as well.

In one exemplary embodiment, ground walnut hulls having a particle size of about 12/20 mesh and a maximum length-based aspect ratio of about 5 may be employed as a proppant particulate. Such materials may be coated for use in these applications as described elsewhere herein.

In one embodiment, a multi-component relatively lightweight and/or substantially neutrally buoyant proppant particle may include a first material and at least one additional, or second, different material. The first material and at least one second material may have different values of in situ Young's modulus and/or be of differing composition. Alternatively, the first material and at least one second material may have similar or same values of in situ Young's modulus and/or be of similar or same composition. In one embodiment, a second material may be present as a protective layer around a first material core, as described further herein. In another embodiment, a second material may be present to alter the overall modulus of a particulate formed therefrom, such as to function as a hardening material. For example, overall in situ Young's modulus of ground walnut hulls may be increased by coating such particles with a layer of relatively hard resin having a higher in situ Young's modulus. A single material may be present to perform both protective and hardening functions, or separate materials may be present to perform each of these respective functions. As used herein, a "layer" refers to a second material that at least partially or completely surrounds a first core material. A layer includes materials that adhere to or are otherwise disposed on the surface of a core material, and/or to those materials that are at least partially absorbed or permeated into a first core material.

In one embodiment, the two or more materials may be configured in virtually any maimer desired to form multi-component particles (for example, as described elsewhere herein) to achieve varying overall density and/or hardness characteristics (or in situ Young's modulus) of such particles, for example, to meet specific formation conditions.

In another embodiment, a first relatively lightweight and/or substantially neutrally buoyant core material may be coated or at least partially surrounded with at least one layer of a second material that may be selected to act to harden and/or isolate or protect the first material from adverse formation or wellbore conditions, for example so as to avoid exposure to acids or other workover/drilling fluids, to avoid saturation with liquids, provide longer fracture proppant pack life, etc. In this regard, any coating material known in the art and suitable for imparting hardness and/or suitable for at least partially protecting or isolating a first relatively lightweight and/or substantially buoyant core material as so described herein may be employed. Examples of such hardening and/or protective materials include, but are not limited to resins (e.g., urethane, phenolic, melamine formaldehyde, etc.) described for other use in other embodiments elsewhere herein. With benefit of this disclosure, suitable coating material/s may be selected by those of skill in the art to achieve or impart the desired qualities to a first relatively lightweight and/or substantially buoyant core material, considering anticipated wellbore and/or formation conditions. Methods for coating particulates (e.g., fracture proppant particles, etc.) with materials such as resin are known in the art, and such materials are available, for example, from manufacturers listed herein. With regard to coating of the disclosed lightweight and/or substantially neutrally buoyant materials, coating operations may be performed using any suitable methods known in the art. For example, low temperature curing methods may be employed if desired (e.g, using fast setting "cold set" or "cold cure" resins), where heating may be a problem, such as when coating materials which may be sensitive to heat, like ground nuts or fruit pits. Alternatively, indirect heating processes may be employed with such materials when it is necessary to heat a coating material for cure.

Examples of resins that may be employed as layers for protective and/or hardening purposes include, but are not limited to, phenol formaldehyde resins, melamine formaldehyde resins, and urethane resins, low volatile urethane resins (e.g., these and other types of resins available from BORDEN CHEMICAL INC., SANTROL, HEPWORTH of England), etc., and mixtures thereof. Specific examples of suitable resins include, but are not limited to, resins from BORDEN CHEMICAL and identified as 500-series and 700-series resins (e.g., 569C, 794C, etc.). Further specific examples of resins include, but are not limited to, "SIGMASET" series low temperature curing urethane resins from BORDEN CHEMICAL (e.g., "SIGMASET", "SIGMASET LV", "SIGMASET XL"), "ALPHASET" phenolic resin from BORDEN, "OPTI-PROP" phenolic resin from SANTROL, and "POLAR PROP" low temperature curing resin from SANTROL. Low temperature curing resins may be applied with little or no heat, which may be desirable when coating heat-sensitive materials such as wood, nut shell material, etc. Alternatively, heat cured resins may be applied and cured using heating methods that are compatible with heat sensitive materials. For example, in one embodiment, ground walnut shells may be coated with SANTROL "OPTI-PROP" resin in a single coating step using indirect heat (e.g., at temperatures of up to about 300° F., or alternatively from about 150° F. to about 200° F.). Where desired, curing characteristics (e.g., curing time, etc.) may be adjusted to fit particular layer application methods and/or final product specifications by, for example, adjusting relative amounts of resin components. Still further examples of suitable resins and coating methods include, but are not limited to, those found in European Patent Application EP 0 771 935 A1; and in U.S. Pat. Nos. 4,869,960; 4,664,819; 4,518,039; 3,929,191; 3,659,651; and 5,422,183, each of the foregoing references being incorporated herein by reference in its entirety.

With benefit of this disclosure, those of skill in the art will understand that first and one or more second materials may be selected to meet particular criteria based on the information and examples disclosed herein, as well as knowledge in the art. In this regard, one or more second material coatings or layers may be present, for example, to substantially protect the ground walnut hull first material from downhole fluids such as formation, drilling, workover fluids (e.g., salt water, acid, etc.), and/or to harden or otherwise modify the first material from closure stress or other mechanical stresses that may be encountered downhole. In this regard, thickness or amount of one or more coatings may be any amount suitable to provide a particle having an altered in situ Young's modulus and/or to provide at least partial protection, for the inner first material, from wellbore or formation conditions.

In one embodiment, a coating of one or more second materials may be from about 0.1% by weight to about 50%, alternatively from about 1% by weight to about 20% by weight, alternatively from about 10% by weight to about 20%, alternatively from about 2% to about 12% by weight of the total weight of the multi-component particle, although greater and lesser amounts are possible. In this way, a first material such as ground walnut shell particulates may be coated with, for example, from about 2% to about 12% of a suitable resin (e.a., BORDEN "SIGMASET LV" resin) by weight of total weight of each particle to form relatively lightweight and/or substantially neutrally buoyant proppant particulate. Such particles may exhibit increased strength and/or resistance to well fluids over uncoated ground walnut hulls. In one embodiment, it has been found that application of from about 8% to about 12% by weight of total particle weight of "SIGMASET LV" resin to ground walnut hull particulate material serves to permeate the material so as to substantially fill the accessible or permeable porosity of the materials such that a relatively shiny or glazed surface appearance is achieved.

In one exemplary embodiment, about 12/20 mesh ground walnut hulls from "COMPOSITION MATERIALS, INC." having an in situ Young's modulus of from about 1,000,000 psi to about 2,000,000 psi (and described elsewhere herein) may be coated with a second material, such as "SIGMASET LV" or "SIGMASET XL" resin available from BORDEN CHEMICAL (in amounts as described elsewhere herein). Such coated particles may be manufactured and/or supplied, for example, by BORDEN CHEMICAL. It will be understood that a protective resin layer may also function as a hardener to the core material, however, an additional and separate hardener material layer may also be present to impart additional hardness to the core material if so desired. In one exemplary embodiment in which such a separate hardener layer is present, ground walnut shell particulates may be first coated with from about 2% to about 10% by weight (and alternatively about 2% by weight) of total weight of a separate hardener material (e.g., BORDEN "2AC" hardener) and then coated with from about 1% to about 20% by weight (and alternatively about 4% by weight)

of another resin (e.g., BORDEN "SIGMASET XL" or "SIGMASET LV" resin). In one exemplary embodiment then, the 12/20 mesh ground walnut shells described above may be coated with about 2% by weight of total weight of BORDEN "2AC" hardener and about 4% by weight of total weight of BORDEN "SIGMASET XL."

It will be understood that the coating amounts given herein are exemplary only, and may be greater or lesser, and that amounts and types of core, separate hardener material and/or other protective layer material/s may be selected with benefit of this disclosure by those of skill in the art to meet or and withstand anticipated downhole conditions of a given application using methods known in the art, such as those described herein (e.g., in Examples 1 and 2). For example, in the embodiment above, ground walnut shell particles having about 2% by weight "SIGMASET XL" may be employed for relatively lower closure stress applications (such as some sand control applications), and ground walnut shell particles having closer to about 10% by weight "SIGMASET XL" may be employed for relatively higher closure stress applications (such as a proppant or fracture pack particulate), although it will be understood that these are exemplary guidelines only.

In one embodiment, the second material coating may be present, for example, to substantially protect the ground walnut hull first material from downhole fluids such as formation, drilling, workover fluids (e.g., salt water, acid, etc.), while at the same time altering the in siti Young's modulus of the particles from a starting value of about 1,000,000 psi to about 2,000,000 psi, to an overall value of from about 2,000,000 to about 3,000,000 psi.

In another exemplary embodiment, ground walnut hulls (or another porous first material) may be partially or completely impregnated with a second material, by for example, vacuum and/or pressure impregnation, spraying with hardener, or a combination thereof. For example, material may be immersed in a second material and then exposed to pressure and/or vacuum to impregnate the material. Such methods are known in the art for impregnating porous materials, such as impregnating core samples with fluids, etc. Alternatively, application of a second material may result in at least partial impregnation, for example, it has been found that up to about 10% to about 12% by weight of total particle weight of resin (such as BORDEN "SIGMASET XL") may be applied and penetrate into the porosity of ground walnut shells. Furthermore, it will be understood that a first relatively lightweight and/or substantially buoyant material may be combined with more than one other material, e.g., using the methods and configurations described elsewhere herein for embodiments involving first and second materials.

It will be understood with benefit of the disclosure that any other material suitable for coating a substantially hard proppant core and having suitable protective, hardening, and/or specific gravity-altering characteristics as defined elsewhere herein may be employed.

Although embodiments of the disclosed method employing layered multi-component particles having two components or layers have been described and illustrated above, it will be understood that other configurations of layered multi-component relatively lightweight and/or substantially neutrally buoyant particles may be employed. For example, layered particles may include a core with two or more layers of materials surrounding the core. Any combination of two or more materials mentioned elsewhere herein may be employed in multi-component particles having a core surrounded by two or more layers. In this regard, particles having two or more layers of materials may be useful for providing desirable properties.

Manufacture of the disclosed embodiments of multi-component particles may be by any suitable method known in the art. In this regard, one or more layers of coatings may be applied using any coating method known in the art to a selected embodiment of core material described elsewhere herein. Coatings may be applied directly, or where required or desirable, binder materials/compositions known to those of skill in the art may be used to enhance ease of application or to enhance integrity of an applied layer/s to a core or underlying layer of selected material.

EXAMPLES

The following examples are illustrative and should not be construed as limiting the scope of the invention or claims thereof.

Example 1: Resin-Coated Ground Walnut Shells

Conductivity tests were performed according to API RP 61 ($1^{st}$ Revision, Oct. 1, 1989) using an API conductivity cell with Ohio sandstone wafer side inserts. Each particulate material sample was loaded into the cell and closure stress applied to the particulate material using a "DAKE" hydraulic press having a "ROSEMOUNT" differential transducer (#3051C) and controlled by a "CAMILE" controller. Also employed in the testing was a "CONSTAMETRIC 3200" constant rate pump which was used to flow deionized water through each particulate sample.

The coated ground walnut particulate material employed was ground walnut hulls from "COMPOSITION MATERIALS, INC." having a size of about 12/20 mesh and having an in situ Young's modulus of from about 1,000,000 psi to about 2,000,000 psi. The ground walnut particulate material was coated with a layer of BORDEN "SIGMASET LV" low volatility resin in an amount of about 12% by weight of total particulate weight, and the particles were manufactured by "BORDEN CHEMICAL". The coated ground walnut particulate material was tested alone, with no other particulate material blended in. It will be understood with benefit of this disclosure that other particles having a similar modulus described elsewhere herein (e.g., ground or crushed nut shells, ground or crushed seeds, etc.) may also be employed in such applications as the sole proppant component of a fracturing fluid.

Experimental parameters for the coated walnut shell conductivity evaluation are shown in Tables I–III below.

TABLE I

| Fluid | Deionized Water |
|---|---|
| Particulate (grams) | 63 |
| Top Core (cm) | 0.91 |
| Bot Core (cm) | 0.968 |
| Initial Total Width (cm) | 5.462 |
| Width Pack, initial (cm) | 1.134 |

TABLE II

| Temperature | 150 | Particulate Size | 12/20 | |
|---|---|---|---|---|
| Closure Pressure | 500–2000 psi | Concentration | 2 | lbs/ft2 |
| Fluid Pressure (psi) | 387 | Baseline | 238 | Darcies |
| | | @ | 1000 | psi |

TABLE III

| Test Data *Time (Hours) | Temp ° C. | Water Rate mls/ min | Viscosity cp | DP psi | Width inches | Conductivity md-ft | Permeability darcies | Closure Stress psi |
|---|---|---|---|---|---|---|---|---|
| 0 | 68.45 | 7.89 | 0.41 | 0.00386 | 0.433 | 22,608 | 626 | 524 |
| 10 | 65.20 | 16.27 | 0.43 | 0.01195 | 0.427 | 15,756 | 442 | 456 |
| 20 | 65.19 | 7.73 | 0.43 | 0.00613 | 0.406 | 14,585 | 432 | 1001 |
| 30 | 65.15 | 7.80 | 0.43 | 0.01445 | 0.355 | 6,251 | 211 | 2029 |
| 40 | 65.21 | 7.87 | 0.43 | 0.01469 | 0.351 | 6,203 | 212 | 2019 |
| 50 | 65.21 | 7.82 | 0.43 | 0.01483 | 0.348 | 6,106 | 211 | 2021 |
| 70 | 65.22 | 7.79 | 0.43 | 0.01516 | 0.346 | 5,947 | 206 | 2021 |

*Values given represent an average of an hour's data at each given point.

As may be seen from the results of this example, a relatively lightweight particulate that is substantially neutrally buoyant in a 10 pound per gallon brine, may advantageously be employed to yield a proppant pack having relatively good conductivity. At 1,000 psi closure stress the pack of relatively lightweight proppant material exhibited permeabilities equal to or exceeding any of the conventional proppants (sand, etc.).

Example 2: Ground Walnut Shells Coated with Various Resins

Using a procedure similar to that of Example 1, the same type of 12/20 mesh ground walnut hull core material was tested with different types of resin layers from BORDEN. Testing was carried out for all samples at 150° F. and closure stresses ranging from 500 psi to 2000 psi. For two of samples, testing was also carried out at 200° F. and closure stress of 2200 psi. Resin type and amounts used in each sample are identified in Table IV. Results of this testing is given in Tables V and VI, and in FIGS. 2 and 3.

TABLE IV

BORDEN Resin Layers on 12/20 Mesh Ground Walnut Shell Material

| Sample Identifier | Layer Type and Amount (% by Weight of Total Weight of Particle)* |
|---|---|
| A | Inner layer of 2% by weight BORDEN "2AC" with Outer Layer of 4% by weight BORDEN "SIGMASET LV" |
| B | Layer of 6% by weight BORDEN "SIGMASET LV" resin (Coated particles having Borden identification code "66040") |
| C | Layer of 6% by weight BORDEN "SIGMASET LV" resin (Coated particles having Borden identification code "66535") |
| D | BORDEN Two Coat Resin — Inner layer of 2% by weight separate hardener material and outer layer of 3% by weight "SIGMASET LV" (Coated particles having Borden identification code "2PN3x") |
| E | Layer of 12% by weight BORDEN "SIGMASET LV" |

*— In Table IV, BORDEN product identification codes 66040 and 66535 denote particles coated with "SIGMASET LV" resin having modified curing characteristics, i.e., the first digit in the code represents the % by weight of resin applied as a percentage of total particle weight (e.g. 6%), the second and third digits in the code represent weight percentage of the first resin component (e.g., 60% and 65% respectively), and the fourth and fifth digits represent weight percentage of the second resin component (e.g., 40% and 35% respectively).

TABLE V

| Closure Stress, psi | Permeability, Darcies | | | | |
|---|---|---|---|---|---|
| | Sample A | Sample B | Sample C | Sample D | Sample E |
| 500 | 453 | 205 | 383 | 429 | 432 |
| 1000 | 303 | 146 | 200 | 153 | 319 |
| 2000 | 220 | 46 | 94 | 88 | 206 |
| | 105 | | | | 76 |

TABLE VI

| Closure Stress, psi | Cell Width, Inches | | | | |
|---|---|---|---|---|---|
| | Sample A | Sample B | Sample C | Sample D | Sample E |
| 500 | 0.43 | 0.43 | 0.41 | 0.41 | 0.43 |
| 1000 | 0.41 | 0.4 | 0.38 | 0.39 | 0.406 |
| 2000 | 0.36 | 0.345 | 0.3 | 0.35 | 0.35 |
| 2200 | 0.32 | | | | 0.299 |

Figure 2:
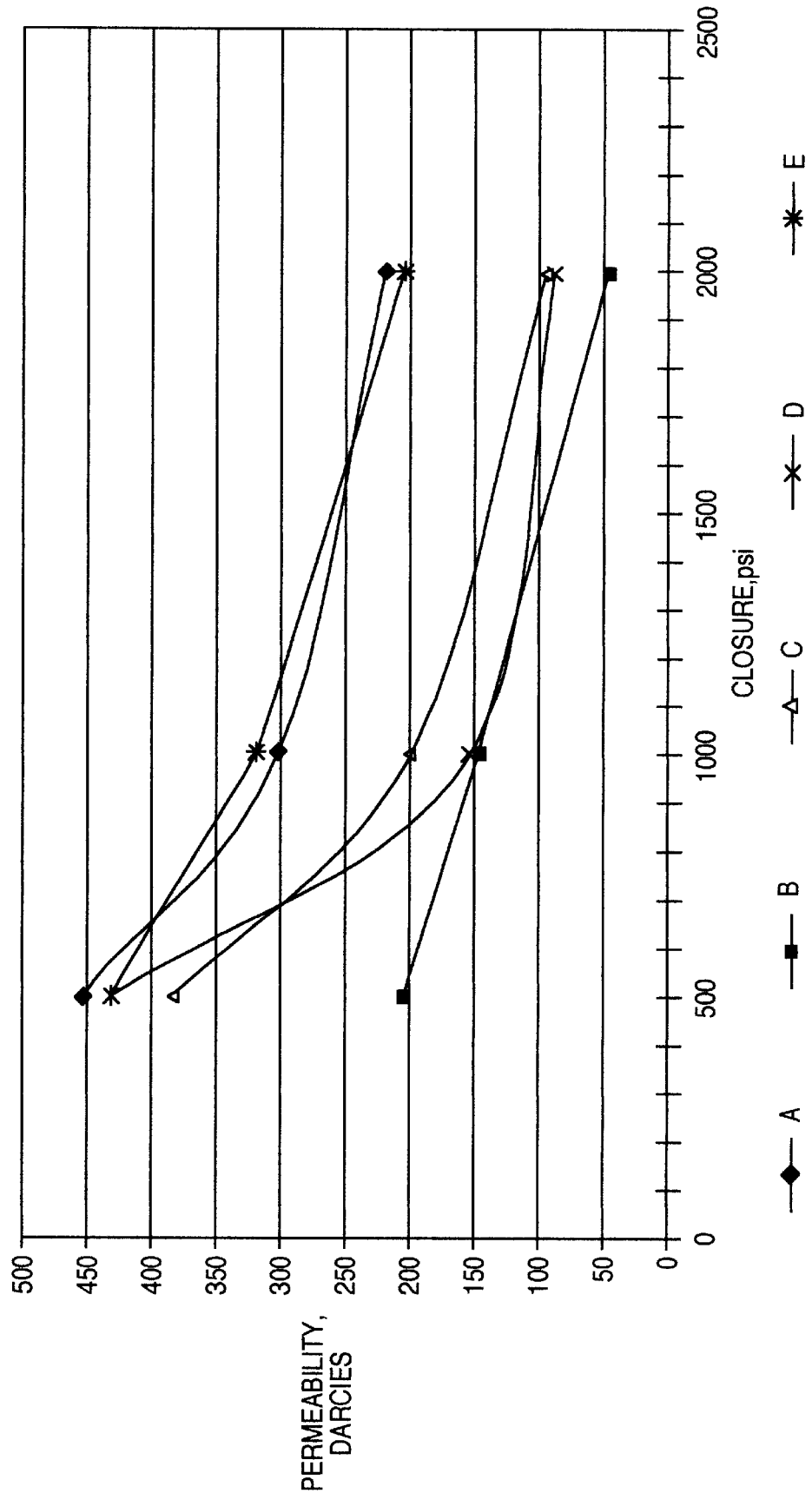
FIG. 2 shows permeability versus closure stress for particulate according to one embodiment of the disclosed method.

FIG. 2 shows the permeability of the relatively lightweight particulate core materials having the various types of resin layers of this example at 500, 1000 and 2000 psi closure stresses and 150° F.

Figure 3:
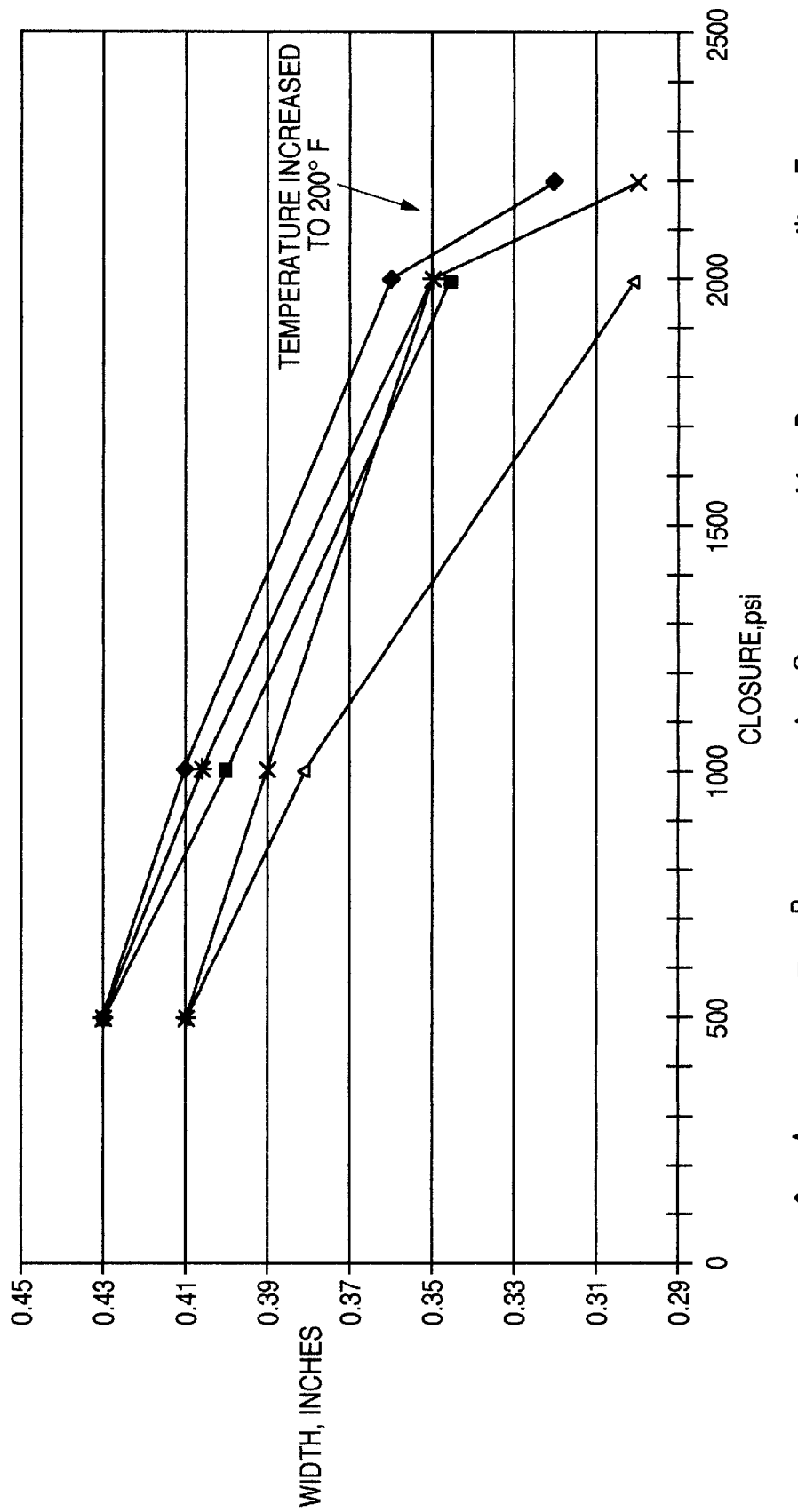
FIG. 3 shows cell width versus closure stress for particulate according to one embodiment of the disclosed method.

FIG. 3 shows pack or conductivity cell width of the relatively lightweight particulate core materials having the various types of resin layers of this example at 500, 1000 and 2000 psi closure stresses and 150° F. Also shown is cell or pack width of the relatively lightweight particulate materials Samples A and E at 2200 psi closure stress and 200° F.

The results of Examples 1 and 2 illustrate just one way that relatively lightweight particulate core materials may be evaluated with various types and/or amounts of resins to fit particular conditions, for example, anticipated wellbore or formation conditions. With benefit of this disclosure, those of skill in the art will understand that using this or other methods known in the art suitable for simulating anticipated downhole conditions, types of relatively lightweight material core materials and coatings (or combinations of two or more coatings) may be selected or tailored for use in a given desired application.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims.

What is claimed is:

1. A method of fracturing a subterranean formation, comprising:
    injecting a particulate material into said subterranean formation at a pressure above the fracturing pressure of said formation;
    wherein at least a portion of said individual particles of said particulate material each comprise a first material selected from at least one of ground or crushed nut shells, ground or crushed seed shells, ground or crushed fruit pits, processed wood, or a mixture thereof; and
    wherein at least a portion of said individual particles of said particulate material each comprises a core component of said first material at least partially surrounded by at least one layer component of second material, said second material comprising a protective or hardening coating.

2. The method of claim 1, wherein said second material comprises at least one of phenol formaldehyde resin, melamine formaldehyde resin, urethane resin, or a mixture thereof.

3. The method of claim 2, wherein said individual particles of said particulate material further comprise a third material hardener applied between said first and second materials.

4. The method of claim 2, wherein said individual particles of said particulate material comprise at least one of ground or crushed walnut shells, ground or crushed ivory nut shells, ground or crushed peach pits, ground or crushed apricot pits, or a mixture thereof.

5. The method of claim 4, wherein said first material comprises ground or crushed walnut shells; and wherein said second material comprises urethane resin.

6. The method of claim 5, wherein said individual particles of said particulate material further comprise a third material hardener applied between said first and second materials.

7. The method of claim 6, wherein said particles have a particle size of from about 4 mesh to about 100 mesh; and wherein said layer component of material comprises from about 1% to about 20% by weight of the total weight of each of said individual particles of said particles.

8. The method of claim 7, wherein said individual particles of said particulate material are injected into said formation as substantially neutrally buoyant particles in a carrier fluid.

9. The method of claim 8, wherein said carrier fluid is an ungelled aqueous fluid, or an aqueous fluid characterized as having a polymer concentration of from greater than about 0 pounds of polymer per thousand gallons of base fluid to about 10 pounds of polymer per thousand gallons of base fluid, and as having a viscosity of from about 1 to about 10 centipoises.

10. The method of claim 2, wherein at least a portion of said individual particles of said material comprise a porous core component that is impregnated with said second material.

11. The method of claim 2, wherein said layer component of material comprises from about 1% to about 20% by weight of the total weight of each of said individual particles of said particles.

12. The method of claim 2, wherein an in situ temperature of said subterranean formation is less than or equal to about 150° F. and an in situ closure of stress of said subterranean formation is less than or equal to about 1500 psi.

13. The method of claim 1, wherein individual particles of said particulate material have a shape with a maximum length-based aspect ratio of equal to or less than about 5.

14. The method of claim 1, wherein substantially all of the individual particles of said particulate material introduced into said well comprise a core component of said first material and a layer component of said second material.

15. A method of fracturing a subterranean formation, comprising:
    introducing a particulate material suspended in a carrier fluid into said subterranean formation at a pressure above a fracturing pressure of said subterranean formation;
    wherein at least a portion of the individual particles of said particulate material are substantially neutrally buoyant in said carrier fluid and comprise:
        a core component of a first material selected from at least one of ground or crushed nut shells, ground or crushed seed shells, ground or crushed fruit pits, processed wood, or a mixture thereof, and
        at least one layer component of second material surrounding said core component, said second material comprising a protective or hardening coating.

16. The method of claim 15, wherein said second material comprises at least one of phenol formaldehyde resin, melamine formaldehyde resin, urethane resin, or a mixture thereof.

17. The method of claim 16, wherein said individual particles of said particulate material further comprise a third material hardener applied between said first and second materials.

18. The method of claim 16, wherein said carrier fluid is an ungelled aqueous fluid, or an aqueous fluid characterized as having a polymer concentration of from greater than about 0 pounds of polymer per thousand gallons of base fluid to about 10 pounds of polymer per thousand gallons of base fluid, and as having a viscosity of from about 1 to about 10 centipoises.

19. The method of claim 18, wherein said particulate material has a specific gravity of from about 1.25 to about 1.35, and wherein said carrier fluid has a specific gravity of between about 1 and about 1.5.

20. The method of claim 19, wherein said wellbore has an angle with respect to the vertical of between about 30 degrees and about 90 degrees.

21. The method of claim 15, wherein said individual particles of said particulate material comprise at least one of ground or crushed walnut shells, ground or crushed ivory nut shells, ground or crushed peach pits, ground or crushed apricot pits, or a mixture thereof; and wherein said second material comprises at least one of phenol formaldehyde resin, melamine formaldehyde resin, urethane resin, or a mixture thereof.

22. The method of claim 15, wherein said carrier fluid is an ungelled aqueous fluid, or an aqueous fluid characterized as having a polymer concentration of from greater than about 0 pounds of polymer per thousand gallons of base fluid to about 10 pounds of polymer per thousand gallons of base fluid, and as having a viscosity of from about 1 to about 10 centipoises.

23. The method of claim 15, wherein said first material comprises ground or crushed walnut shells; wherein said second material comprises urethane resin; and wherein said individual particles of said particulate material further comprise a third material hardener disposed between said first and second materials.

24. The method of claim 15, wherein substantially all of the individual particles of particulate material contained in said carrier fluid are substantially neutrally buoyant in said carrier fluid, and comprise a core component of said first material and a layer component of said second material.

* * * * *

UNITED STATES PATENT AND TRADEMARK OFFICE
Certificate

Patent No. 6,364,018 B1                                                          Patented: April 2, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Harold D. Brannon, Spring, TX; Allan R. Rickards, Pinehurst, TX; Christopher J. Stephenson, Houston, TX; Gino A. DiLullo, Caracas, Vennezuela; and Philip J. Rae.

Signed and Sealed this Sixth Day of January 2004.

DAVID J. BAGNELL
*Supervisory Patent Examiner*
Art Unit 3672

UNITED STATES PATENT AND TRADEMARK OFFICE
Certificate

Patent No. 6,364,018 B1                                                                                                    Patented: April 2, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Harold D. Brannon, Spring, TX; Allan R. Rickards, Pinehurst, TX; Christopher J. Stephenson, Houston, TX; Gino A. DiLullo, Caracas, Vennezuela; and Philip J. Rae, Landridge Condo, Singapore.

Signed and Sealed this Sixth Day of July 2004.

DAVID J. BAGNELL
*Supervisory Patent Examiner*
Art Unit 3672